ERROR CHECKING METHOD AND APPARATUS

Filed Jan. 20, 1964 2 Sheets-Sheet 1

Inventor:
Djordje Kramer
By: Spencer & Kaye
ATTORNEYS

Inventor:
Djordje Kramer
By: Spencer & Kaye
ATTORNEYS 3,351,905
Patented Nov. 7, 1967

3,351,905

ERROR CHECKING METHOD AND APPARATUS

Djordje Kramer, Fislisbach-Aargau, Switzerland, assignor to Licentia Patent-Verwaltungs-G.m.b.H., Frankfurt am Main, Germany Filed Jan. 20, 1964, Ser. No. 338,723
Claims priority, application Germany, Jan. 18, 1963, L 43,923
14 Claims. (Cl. 340—146.1)

ABSTRACT OF THE DISCLOSURE

An error checking arrangement in which the same information is written into a plurality of storage elements which are to be checked. A circuit is provided which produces an error signal if at least one of these storage elements fails to produce a signal representing this information.

The present invention relates to a method and apparatus for checking pulsed, electronic storage elements during operation thereof.

Pulse controlled, electronic storage elements are widely used in the numerical control and regulating art, e.g., in machine tools in which a work tool is moved relative to a work piece, or vice versa. Such storage elements are so arranged that when a clock pulse signal is applied to the element, the element takes over, i.e., has written into it a binary input signal corresponding to L ($L$=binary 1) or to 0 which is applied to the intelligence input of the elements. This intelligence remains stored in the element after the signal has disappeared, i.e., the element stores the value L or 0. The instant at which the binary input signal is actually taken over by the storage element is determined by means of the transient pulse signals. Such storage elements can, by means of further binary signals, also be erased or pre-set. Such pulse-controlled storage elements are, in practice, used in such systems or arrangements in which binary signals are to be taken over and stored at given instants, as, for example, computer systems, shifting registers, and the like. The storage elements have, for example, one signal input and one or two inputs for the clock pulse signals, as well as a further input for receiving a pre-setting signal and a still further input for receiving an erase signal. The storage element can produce two output signals which are mutually antivalent or complementary, i.e., when one of the signals is L the other is 0, and vice versa. If a pre-setting signal L is applied to the storage element, a given one of the outputs of the element will present the signal L irrespective of the signals applied to the other inputs (this arrangement being one in which the pre-setting dominates). Also, the clock pulse signals controlling the element are antivalent to each other. Conventional storage elements consist, essentially, of a logic circuit having diodes and resistors, which circuit is suitably controlled by a two-stage power amplifier one of whose outputs is fed back to the logic circuit.

In systems using a large number of such storage elements, the failure of individual circuit components of the storage elements, e.g., transistors, resistors, diodes, lead ruptures, or the like, will impair the operation of the system, and this could result in incorrect values being put out. It will be appreciated that, in practice, the putting out of erroneous results is something which must be avoided at all costs.

It is, therefore, the primary object of the present invention to provide a way of checking such storage elements during operation of the system, and, with this object in view, the present invention resides in a method and apparatus in which a plurality of clock pulse controlled electronic storage elements are checked during operation, this being effected as follows: All of the storage elements to be tested are subjected to a write-in signal by means of which all of the elements are made to contain the same information. The signals thus stored by the elements are temporarily applied to a logic circuit which puts out an error signal in the event one or more of the elements fail to produce a signal representing the information written into all of the elements. All of the elements are then erased, and the output signals produced by the now-erased elements are temporarily applied to a second logic circuit which puts out an error signal in the event one or more of the elements fail to produce a signal representative of the erased condition.

Structurally, the invention resides in the provision of logic circuitry which is arranged to receive the output signals of all of the storage elements to be checked, which circuitry puts out an error signal if the output signal produced, at the proper instants, by any one of the storage elements is different from the output signal produced by the other storage elements. The circuitry may incorporate two logic circuits; one of these has a plurality of inputs connected to the outputs of the respective storage elements, and the other logic circuit has two inputs one of which is connected to the output of the first logic circuit and the other of which is connected to receive a test signal so that the error signal, appearing in the case of malfunction of one or more of the storage elements, may be triggered to appear at the desired instant.

Additional objects and advantages of the present invention will become apparent upon consideration of the following description when taken in conjunction with the accompanying drawings in which.

Figures 1, 2:
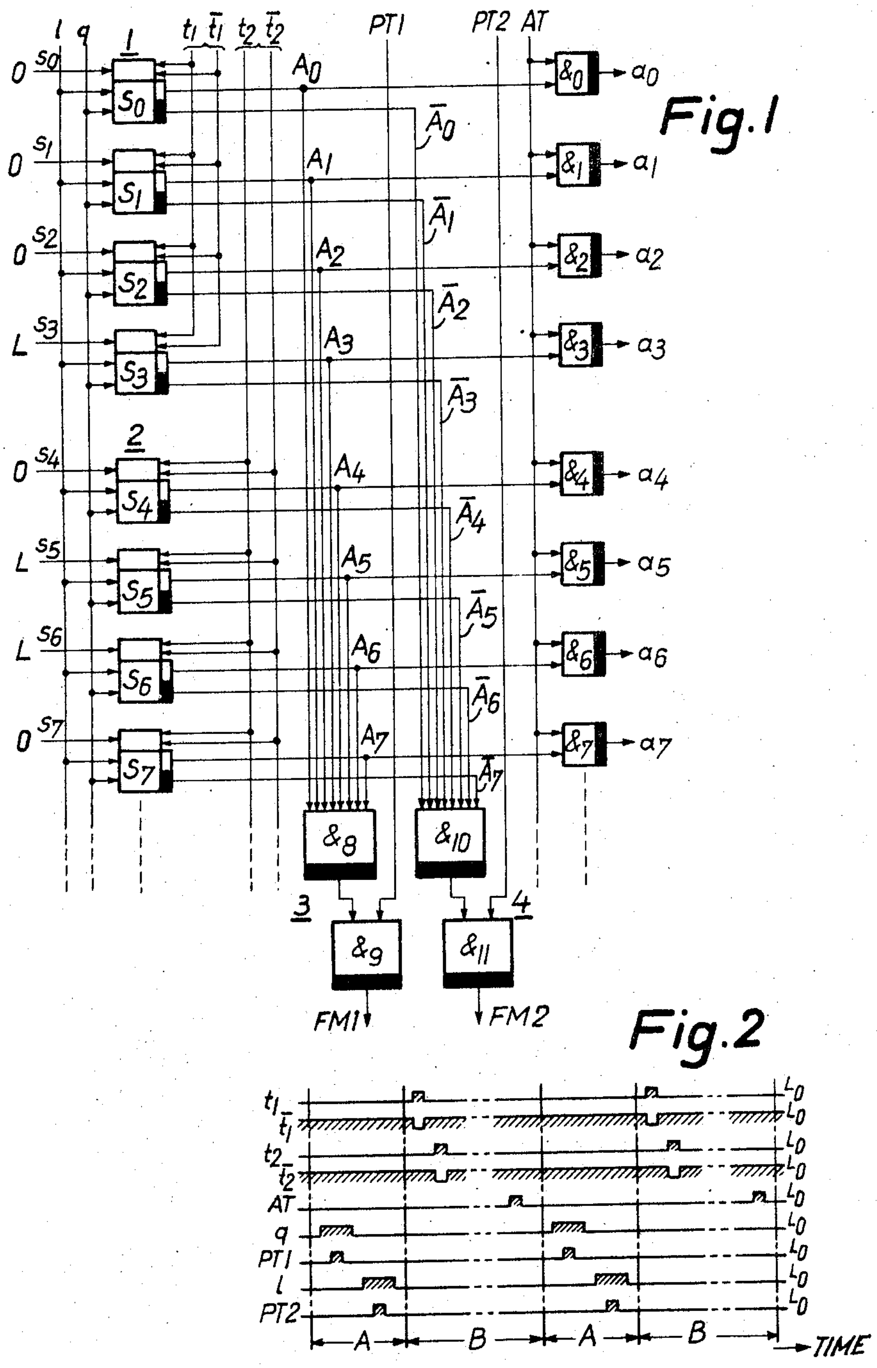
FIGURE 1 is a circuit diagram of one embodiment of an error checking arrangement according to the present invention.
FIGURE 2 is a diagram showing the timed relationship of various pulses applied to the circuit of FIGURE 1.

Referring now to the drawings and to FIGURE 1 thereof in particular, the same shows but a portion of a larger numerical control arrangement, the illustrated portion consisting of composite storage groups 1, 2, and so on. The storage group 1 consists of clock pulse controlled storage elements $S_0$, $S_1$, $S_2$, $S_3$ and the storage group 2 of storage elements $S_4$, $S_5$, $S_6$, $S_7$. The elements of group 1 are, for example, controlled by decimal numbers which are encoded in the natural binary code, each binary digit of the encoded decimal number being an electrical signal corresponding to L or to 0. These signals are applied to inputs $s_0$, $s_1$, $s_2$, $s_3$. In the example shown in FIGURE 1, it is the decimal number 8, which equals the binary number L000, which is applied to the inputs of the storage elements of group 1. The binary number 0LL0 which is shown as being applied to the inputs $s_4$ to $s_7$ of the storage elements $S_4$ to $S_7$ corresponds to the decimal number 6.

The storage elements $S_0$ to $S_3$ of group 1 take over the binary signals appearing at their respective inputs upon the appearance of the complementary clock pulse signals $t_1$ and $\bar{t}_1$, while the storage elements $S_4$ to $S_7$ of group 2 take over the binary signals appearing at their respective inputs upon the appearance of the complementary clock pulse signals $t_2$ and $\bar{t}_2$. The storage elements of further groups (not shown in FIGURE 1) will be triggered to receive their respective input signals upon the appearance of further complementary clock pulses. Here the clock pulses $t_1/\bar{t}_1$, $t_2/\bar{t}_2$, etc., may, beginning with the clock pulses applied to group 1, appear consecutively, so that the input signals applied to the elements of the groups will be taken over sequentially. The value written into the storage elements via their respective inputs $s_0$ to $s_7$ can be erased by means of an erase signal which is applied to input 1. The storage elements have a further input $q$ to which a pre-setting pulse can be applied, by means of which the elements will be made to assume a stored condition. The 1-inputs of all of the elements and the $q$-inputs of all of the elements are connected with each other, as shown.

Each of the storage elements has an affirmed and a negated output represented by the white and black rectangles, respectively. The two outputs are complementary in that if L appears at one, 0 appears at the other, and vice versa. The affirmed outputs are indicated a $A_0$, $A_1$, $A_2$, $A_3$, $A_4$, $A_5$, $A_6$, $A_7$, while the negated outputs are shown at $\overline{A}_0$, $\overline{A}_1$, $\overline{A}_2$, $\overline{A}_3$, $\overline{A}_4$, $\overline{A}_5$, $\overline{A}_6$, $\overline{A}_7$. Each of the affiirmed outputs $A_0$ to $A_7$ is connected to one input of a corresponding AND/NOT-circuit $\&_0$, $\&_1$, $\&_2$, $\&_3$, $\&_4$, $\&_5$, $\&_6$, $\&_7$, the other input of each circuit being connected to receive a signal AT. The AND/NOT-circuits act as gates, in that when a signal is applied to the AT input, the circuits are "open" and the signal appearing at the other input of each respective circuit, namely, the affirmed output signal of the respective storage element, is passed through so that all signals appear at the outputs $a_0$, $a_1$, $a_2$, $a_3$, $a_4$, $a_5$, $a_6$, $a_7$, of the gates. These outputs are connected to further digitally operating devices (not shown) which process the information stored in the storage elements.

As indicated above, it is the purpose of the present invention to check whether the storage elements $S_0$ to $S_7$, which form part of a larger arrangement, are functioning correctly, this checking to be carried out during the operation of the apparatus. According to the present invention, this checking is carried out by providing two logic circuits 3 and 4. The logic circuit 3 consists, for example, of an AND/NOT-circuit $\&_8$ which has eight inputs connected to receive the affirmed output signals $A_0$ to $A_7$ of the storage elements $S_0$ to $S_7$, and an AND/NOT-circuit $\&_9$ one of whose inputs is connected to receive the output of circuit $\&_8$ and the other of whose inputs is connected to receive a test signal PT1. The output of circuit $\&_9$ is indicated at FM1. The logic circuit 4 consists of an AND/NOT-circuit $\&_{10}$ which has eight inputs connected to receive the negated output signals $\overline{A}_0$ to $\overline{A}_7$ of storage elements $S_0$ to $S_7$, and an AND/NOT-circuit $\&_{11}$ one of whose inputs is connected to receive the output of circuit $\&_{10}$ and the other of whose inputs is connected to receive a test signal PT2. The output of circuit $\&_{11}$ is indicated at FM2.

The operation of the system is as follows:

It is assumed that the storage element groups 1 and 2 have passed on their contents, via outputs $a_0$ to $a_7$, to further digital components. Before new signals applied to the inputs $s_0$ to $s_7$ of the storage elements $S_0$ to $S_7$ are actually taken over by these elements upon the appearance of the clock pulse $t_1/\bar{t}_1$ $t_2/\bar{t}_2$, a signal L is applied to the input $q$ of each element. This signal is taken over directly by the elements $S_0$ to $S_7$ and appears at the outputs $A_0$ to $A_7$ thereof. These signals, corresponding to L, are applied to the logic circuit 3. If all of the storage elements $S_0$ to $S_7$ are operating properly, the output signal of AND/NOT-circuit $\&_8$ will be a signal corresponding to 0. This signal is, as explained above and as is apparent from FIGURE 1, applied to one input of AND/NOT-circuit $\&_9$, so that even when a test signal $PT1=L$ is applied to the other input of AND/NOT-circuit $\&_9$, the output of that circuit will remain equal to L. This shows that all of the storage elements $S_0$ to $S_7$ are in working order. If, however, one (or more) of the storage elements $S_0$ to $S_7$ were not functioning properly and if this malfunction were to manifest itself by the appearance of a 0 at the output A of the malfunctioning storage element (or elements), the output signal of AND/NOT-circuit $\&_8$ would no longer be 0 but L (this, because not all of the inputs=L), and this, in turn, would, upon the application of a test signal $PT1=L$ to the other input of AND/NOT-circuit $\&_9$, result in an output signal $FM1=0$. This 0 signal would thus be indicative of a malfunction of one of the storage elements.

Some time after the application of the test signal PT1, an erase signal is applied to the inputs 1 of the storage elements $S_0$ to $S_7$, thereby erasing the contents of the storage elements which resulted from the application of a signal L to the $q$-inputs. The second test signal PT2 is then applied to the second logic circuit 4. The inputs of the AND/NOT-circuit $\&_{10}$ are connected to the negated outputs $\overline{A}_0$ to $\overline{A}_7$ of the storage elements, these being the outputs at which the signal L appears after the storage elements have been erased. If the storage elements are functioning properly, the AND/NOT-circuit will put out a 0 signal. Consequently, the appearance of test signal $PT2=L$ has no effect on the output signal FM2 of AND/NOT-circuit $\&_{11}$ which will continue to be L. If, however, the output signal at one (or more) of the negated outputs of the storage elements is, due to malfunction of the element (or elements) equal to 0, the AND/NOT-circuit $\&_{10}$ will put out a signal L so that the appearance of the test signal $PT2=L$ will cause the output signal FM2 of AND/NOT-circuit $\&_{11}$ to change from L to 0, which indicates that at least one of the storage elements is not functioning properly.

FIGURE 2 shows the timed relationship between the various pulses. As explained above, the clock pulses $t_1/\bar{t}_1$ control the storage elements $S_0$ to $S_3$ of group 1, and the clock pulses $t_2/\bar{t}_2$ control the storage elements $S_4$ to $S_7$ of group 2. The signal AT controls the AND/NOT-circuits $\&_0$ to $\&_7$, and $q$ is the pre-setting or store signal for the storage element. The first test signal PT1 for the first logic circuit 3 appears in time-shifted relationship. The values written into the storage elements by the signal $q$ are then erased by the erasing signal 1. The second test signal PT2 for the second logic circuit 4 appears in time-shifted relationship. Portion A of the diagram of FIGURE 2 shows the double checking of the storage elements $S_0$ to $S_7$. If it has been determined that these storage elements are functioning properly—as indicated by the signals appearing at the outputs FM1 and FM2—the signals appearing at the inputs $s$ of the storage elements are taken over upon the application of the clock pulsing $t_1/\bar{t}_1$, $t_2/\bar{t}_2$, and so on, and, upon the appearance of pulse AT (part B of FIGURE 2) are passed through the gates $\&_0$ to $\&_7$ to the outputs $a_0$ to $a_7$. This completes one cycle of operation, after which again follows the double checking of the storage elements by the application of further test signals PT1 and PT2.

Figure 3:
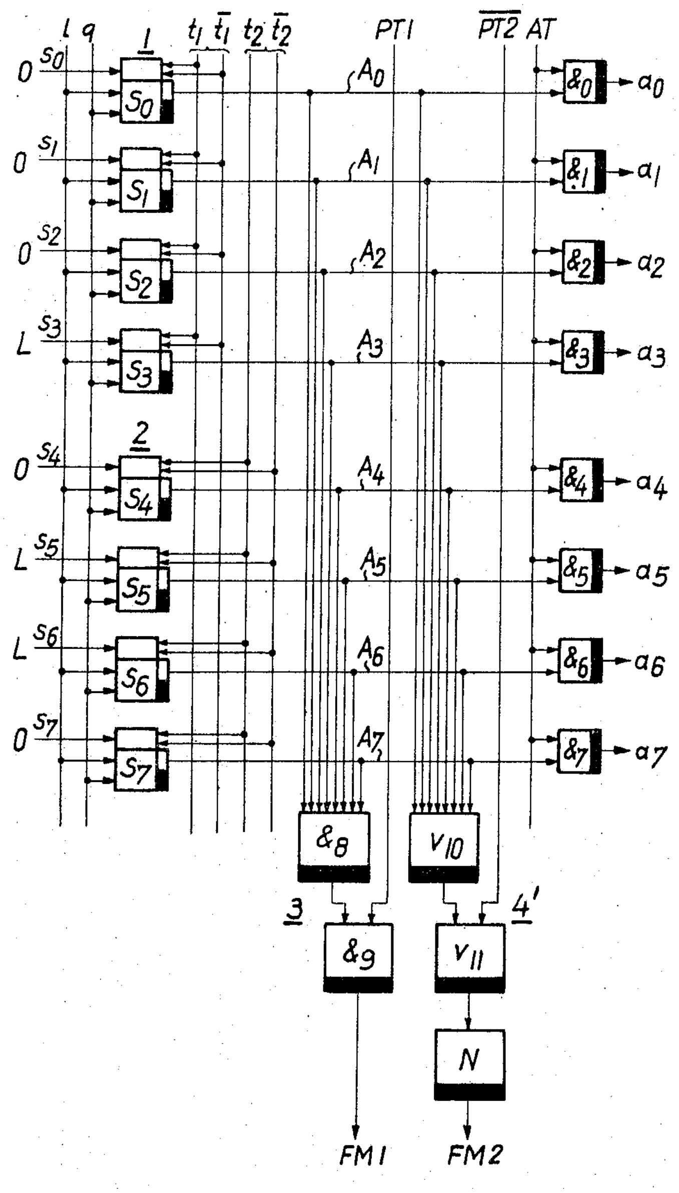
FIGURE 3 is a circuit diagram of another embodiment of an error checking arrangement according to the present invention.

The embodiment of FIGURE 3 differs from that described in connection with FIGURE 1 in that the second logic circuit 4' consists of an OR/NOT-circuit $v_{10}$ which has its inputs connected to the affirmed outputs $A_0$ to $A_7$ of the storage elements $S_0$ to $S_7$. The output of OR/NOT-circuit $v_{10}$ is applied to one input of a further OR/NOT-circuit $v_{11}$ whose other input is connected to receive a negated test signal $\overline{PT2}$. The output of OR/NOT-circuit $v_{11}$ is connected to the input of a NOT-circuit N.

The arrangement according to FIGURE 3 operates as follows:

Inasmuch as an erase signal is applied to the inputs 1 of the storage elements $S_0$ to $S_7$ somewhat after the application of a test signal PT1, the contents which has been written into the storage elements by the prior application of a signal $q=L$ is erased. The test signal $\overline{PT2}$ is then applied to the logic circuit 4'. Since the inputs of the OR/NOT-circuit $v_{10}$ are connected to the affirmed outputs $A_0$ to $A_7$ of the storage elements, and since these outputs will carry the signal 0 after the contents of the storage elements has been erased, the output signal of OR/

NOT-circuit $v_{10}$ will—if the storage elements are functioning properly—be L. Consequently, the application of the test signal $\overline{PT2}$ will not change the output signal L appearing at output FM2 of the NOT-circuit N. If, however, one (or more) of the outputs $A_0$ to $A_7$ were equal to L, the output signal of OR/NOT-circuit $v_{10}$ would be 0, and the appearance of the test signal $\overline{PT2}$ would cause the output signal FM2 of NOT-circuit N to change from L to 0, thereby to indicate that at least one of the storage elements was not functioning properly.

It will be understood that the above description of the present invention is susceptible to various modifications, changes, and adaptations, and the same are intended to be comprehended within the meaning and range of equivalents of the appended claims. For example, the present invention is not limited to the particular combinations of conjunctive and disjunctive logic circuits shown in FIGURES 1 and 3, since other combinations of logic circuits may be provided by persons skilled in the art. Thus, the logic circuitry connected to the affirmed outputs of the storage elements may incorporate disjunctive logic circuits; or the circuitry as a whole may be modified to incorporate conjunctive and disjunctive circuits with affirmed instead of negated outputs, i.e., AND-circuits and OR-circuits instead of the AND/NOT-circuits and OR/NOT-circuits shown in FIGURES 1 and 3.

What is claimed is:

1. An error checking arrangement for use with a plurality of storage elements each having an input and an output, said arrangement comprising, in combination:

(a) means connected to the inputs of the storage elements for writing the same information into all of the storage elements to be checked;

(b) means connected to the outputs of the storage elements for producing a first error signal in the event at least one of the storage elements fails to produce a signal representing said information;

(c) means connected to the inputs of the storage elements for erasing the information written thereinto by said writing-in means; and (d) means connected to the outputs of the storage elements for producing a second error signal in the event at least one of the storage elements fails to produce a signal representative of the erased condition, each of said error signal means comprising (1) a first logic circuit having a plurality of inputs connected, respectively, to the outputs of the storage elements, (2) a second logic circuit having two inputs one of which is connected to the output of said first logic circuit, and (3) means for applying a test signal to the other of said two inputs of said second logic circuit.

2. An error checking arrangement as defined in claim 1 wherein the logic circuits of at least one of said error signal means are conjunctive circuits.

3. An error checking arrangement as defined in claim 1 wherein the logic circuits of at least one of said error signal means are disjunctive circuits.

4. An error checking arrangement as defined in claim 1 wherein each of the storage elements has an affirmed and a negated output, and wherein said inputs of said first logic circuit of said first error signal means are connected to the affirmed outputs of the storage elements and said inputs of said first logic circuit of said second error signal means are connected to the negated outputs of the storage elements.

5. An error checking arrangement as defined in claim 4 wherein said first and second logic circuits of said first error signal means are AND/NOT-circuits.

6. An error checking arrangement as defined in claim 5 wherein said first and second logic circuits of said second error signal means are AND/NOT-circuits.

7. An error checking arrangement as defined in claim 5 wherein said first and second logic circuits of said second error signal means are OR/NOT-circuits, the test signal applied to said last-mentioned second OR/NOT-circuit being a negated test signal.

8. An error checking arrangement as defined in claim 7 wherein said second error signal means further comprises a NOT-circuit having an input connected to the output of said second OR/NOT-circuit.

9. An error checking arrangement for use with a plurality of storage elements each having an input and an output, said arrangement comprising, in combination:

(a) means connected to the inputs of the storage elements for writing the same information into all of the storage elements to be tested; and (b) means connected to the outputs of the storage elements for producing an error signal in the event at least one of the storage elements fails to produce a signal representing said information, said error signal means comprising:

(1) a first logic circuit having a plurality of inputs connected, respectively, to the outputs of the storage elements, (2) a second logic circuit having two inputs one of which is connected to the output of said first logic circuit, and (3) means for applying a test signal to the other of said two inputs of said second logic circuit.

10. An error checking arrangement as defined in claim 9 wherein said logic circuits are conjunctive circuits.

11. A circuit arrangement comprising, in combination:

(a) plurality of storage elements, each having first input means for receiving an intelligence signal, second input means for receiving clock pulsing upon the application of which the information applied to said first input means is stored by the respective storage element, third input means for receiving a store signal, fourth input means for receiving an erase signal, an affirmed output, and a negated output;

(b) first error signal means for producing an error signal in the event at least one of said storage elements, after having received a store signal via said third input means, fails to produce an output representative of the stored condition, said first error signal means incorporating a first logic circuit having a plurality of inputs connected, respectively, to the affirmed outputs of said storage elements, and a second logic circuit having two inputs one of which is connected to receive the output of said first logic circuit and the other of which is connected to receive a test signal; and (c) second error signal means for producing an error signal in the event at least one of said storage elements, after having received an erase signal via said fourth input means, fails to produce an output representative of the erased condition, said second error signal means incorporating a third logic circuit having a plurality of inputs connected, respectively, to said negated outputs of said storage elements, respectively, and a fourth logic circuit having two inputs one of which is connected to receive the output of said third logic circuit and the other of which is connected to receive a test signal.

12. A circuit arrangement as defined in claim 11, further comprising:

(d) a plurality of gates each having two inputs one of which is connected to the affirmed output of a respective one of said storage elements;

(e) means for applying clock pulses to said second input means of said storage elements; and (f) means for applying a gating signal to the other of said two inputs of each of said gates after clock pulsing has been applied to said second input means of said storage elements, thereby to pass through said plurality of gates the intelligence signals applied to said first input means of said storage elements.

13. A circuit arrangement comprising, in combination:

(a) a plurality of storage elements, each having first input means for receiving an intelligence signal, second input means for receiving clock pulsing upon the application of which the information applied to said first input means is stored by the respective storage element, third input means for receiving a store signal, fourth input means for receiving an erase signal, and an affirmed output;

(b) first error signal means for producing an error signal in the event at least one of said storage elements, after having received a store signal via said third input means, fails to produce an output representative of the stored condition, said first error signal means incorporating a first logic circuit having a plurality of inputs connected, respectively, to the affirmed outputs of said storage elements, and a second logic circuit having two inputs one of which is connected to receive the output of said first logic circuit and the other of which is connected to receive a test signal; and (c) second error signal means for producing an error signal in the event at least one of said storage elements, after having received an erase signal via said fourth input means, fails to produce an output representative of the erased condition, said second error signal means incorporating a third logic circuit having a plurality of inputs connected, respectively, to said affirmed outputs of said storage elements, respectively, and a fourth logic circuit having two inputs one of which is connected to receive the output of said third logic circuit and the other of which is connected to receive a negated test signal.

14. A circuit arrangement as defined in claim 13, further comprising:

(d) a plurality of gates each having two inputs one of which is connected to the affirmed output of a respective one of said storage elements;

(e) means for applying clock pulses to said second input means of said storage elements; and (f) means for applying a gating signal to the other of said two inputs of each of said gates after clock pulsing has been applied to said second input means of said storage elements, thereby to pass through said plurality of gates the intelligence signals applied to said first input means of said storage elements.

References Cited

UNITED STATES PATENTS

| | | |
|---|---|---|
| 3,164,727 | 1/1965 | Heyda. |
| 3,167,754 | 1/1965 | Smit et al. |
| 3,176,269 | 3/1965 | Croad. |
| 3,213,428 | 10/1965 | Bianchi et al. |
| 3,237,157 | 2/1966 | Higby. |

MALCOLM A. MORRISON, *Primary Examiner.*

M. J. SPIVAK, V. SIBER, *Assistant Examiners.*